United States Patent
Kosaka et al.

(10) Patent No.: US 10,132,274 B2
(45) Date of Patent: Nov. 20, 2018

(54) INTERNAL EGR AMOUNT CALCULATION DEVICE FOR INTERNAL COMBUSTION ENGINE

(71) Applicant: HONDA MOTOR CO., LTD., Minato-ku, Tokyo (JP)

(72) Inventors: Yosuke Kosaka, Wako (JP); Koichiro Shinozaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1162 days.

(21) Appl. No.: 13/909,850

(22) Filed: Jun. 4, 2013

(65) Prior Publication Data
US 2014/0000572 A1    Jan. 2, 2014

(30) Foreign Application Priority Data

Jun. 27, 2012 (JP) .................. 2012-144061

(51) Int. Cl.
*F02M 25/07* (2006.01)
*F02D 13/02* (2006.01)
*F02M 26/01* (2016.01)

(52) U.S. Cl.
CPC ..... *F02M 25/0752* (2013.01); *F02D 13/0265* (2013.01); *F02M 26/01* (2016.02); *Y02T 10/18* (2013.01)

(58) Field of Classification Search
CPC ............ F02M 25/0752; F02D 13/0261; F02D 13/0265; F02D 41/006; F02D 41/0062;
(Continued)

(56) References Cited

U.S. PATENT DOCUMENTS

2004/0139949 A1 * 7/2004 Koseki et al. ........... 123/568.14

FOREIGN PATENT DOCUMENTS

DE    102 13 138 A1    5/2003
JP    2001-221105 A    8/2001
(Continued)

OTHER PUBLICATIONS

Japanese Patent Office, Decision on Final Rejection for corresponding JP Patent Appln. No. 2012-144061, dated Nov. 24, 2015.
(Continued)

*Primary Examiner* — Hai Huynh
*Assistant Examiner* — Gonzalo Laguarda
(74) *Attorney, Agent, or Firm* — Squire Patton Boggs (US) LLP

(57) ABSTRACT

An internal EGR amount calculation device for an internal combustion engine, which, even when a timing position relationship between a valve overlap period and an exhaust top dead center has changed, can properly calculate an internal EGR amount according to the change and can improve a calculation accuracy of the internal EGR amount. The internal EGR amount calculation device for an internal combustion engine includes an ECU. The ECU calculates a basic blow back gas amount, calculates a crank angle position in the center between the starting point and the ending point of the valve overlap period as an overlap center position, calculates a blow back gas amount by correcting the basic blow back gas amount according to the overlap center position, and calculates the internal EGR amount, using the calculated blow back gas amount.

8 Claims, 12 Drawing Sheets

(58) Field of Classification Search
CPC ....... F02D 2041/0017; F02D 2041/001; F02D 2041/0062; Y02T 10/18; Y02T 10/121; Y02T 10/47
USPC .................................................. 123/568.14
See application file for complete search history.

(56) References Cited

FOREIGN PATENT DOCUMENTS

| | | |
|---|---|---|
| JP | 2004-251182 A | 9/2004 |
| JP | 2006-189013 A | 7/2006 |
| JP | 2011-047367 A | 3/2011 |

OTHER PUBLICATIONS

German Patent and Trademark Office, Office Action corresponding to Appln. No. 10 2013 212 014.1, dated Aug. 29, 2017.

* cited by examiner

| GAIR\NE | NE1 ·········· NEj |
|---|---|
| GAIR1 ⋮ GAIRi | TRQ11 ·········· TRQ1j ⋮ ⋮ TRQi1 ·········· TRQij |

F I G. 1 1 A
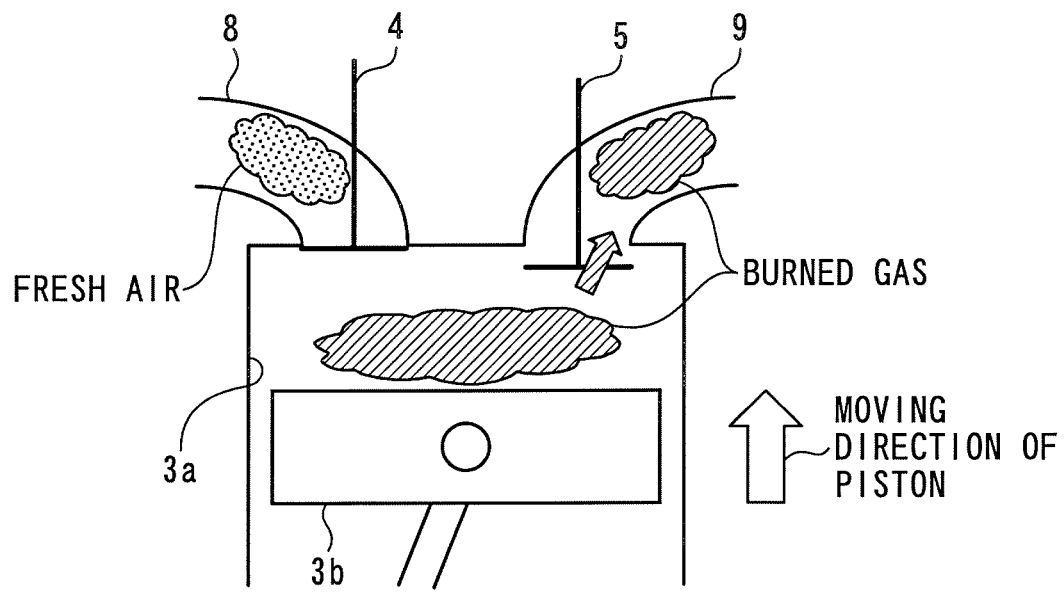
F I G. 1 1 B
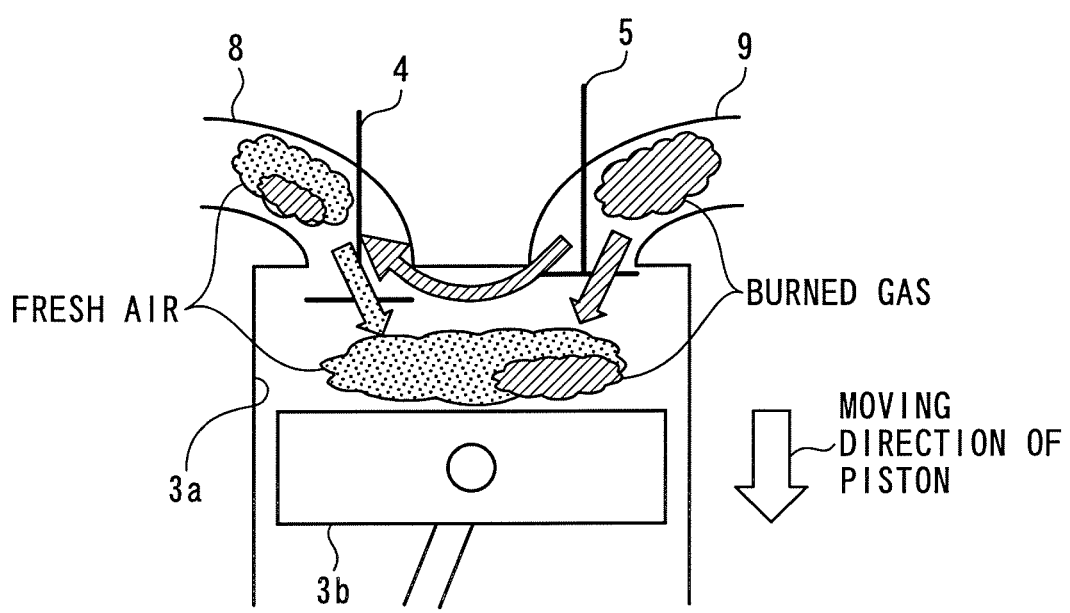

INTERNAL EGR AMOUNT CALCULATION DEVICE FOR INTERNAL COMBUSTION ENGINE

CROSS-REFERENCE TO RELATED APPLICATION

This application is based upon and claims the benefit of priority of Japanese Patent Application No. 144061/2012, filed Jun. 27, 2012, the disclosure of the prior application is hereby incorporated in its entirety by reference.

BACKGROUND OF THE INVENTION

Field of the Invention

The present invention relates to an internal EGR amount calculation device for an internal combustion engine, which calculates an internal EGR amount of the engine.

Description of the Related Art

Conventionally, as an internal EGR amount calculation device for an internal combustion engine, one described in Japanese Laid-Open Patent Publication (Kokai) No. 2004-251182 is known. This internal EGR amount calculation device calculates an internal EGR amount by adding a blow back gas amount to a residual burned gas amount. This residual burned gas amount is an amount of burned gas remaining in a cylinder and is calculated specifically using the equation of state of gas.

Further, the blow back gas amount represents an amount of burned gas which has once flowed into an intake passage from an exhaust passage and then has been blown back into the cylinder, due to the pressure difference between the intake passage and the exhaust passage. This blow back gas amount is calculated using the nozzle equation, by regarding a flow passage through which the burned gas flows, as a nozzle.

The nozzle equation includes an integrated value of an effective opening area, and the integrated value of the effective opening area is calculated as a function of the length of a valve overlap period (i.e. a crank angle from a valve opening timing of an exhaust valve to a valve closing timing of an intake valve) and an engine speed.

In general, in the case of an internal combustion engine in which the valve overlap period is changed, although the blow back gas amount has a high correlation with the length of the valve overlap period, the blow back gas amount has characteristics that it changes due to a timing position relationship between the valve overlap period and the exhaust top dead center, even if the valve overlap period is the same. For example, assuming that the valve overlap period is the same, when a comparison is made between a state in which the proportion of a time period after the exhaust top dead center is smaller and a state in which the proportion of a time period after the exhaust top dead center is larger, the blow back gas amount is larger in the state in which the proportion of the period after the exhaust top dead center is larger, due to the fact that the burned gas is directly returned to the cylinder from the exhaust passage (see FIGS. 8 and 10, referred to hereinafter).

In contrast, in the case of the internal EGR amount calculation device described in above Japanese Laid-Open Patent Publication (Kokai) No. 2004-251182, the equation for calculating the blow back gas amount only uses the function of the length of the valve overlap period and the engine speed, and the above-mentioned characteristics that the blow back gas amount changes due to the timing position relationship between the valve overlap period and the exhaust top dead center is not taken into consideration. Therefore, when the blow back gas amount changes as mentioned above, a calculation error of the blow back gas amount increases, so that the calculation accuracy of the internal EGR amount decreases.

SUMMARY OF THE INVENTION

It is an object of the present invention to provide an internal EGR amount calculation device for an internal combustion engine, which can properly calculate an internal EGR amount according to the change and can improve a calculation accuracy of the internal EGR amount, even when a timing position relationship between the valve overlap period and the exhaust top dead center has changed.

To attain the above object, the present invention provides an internal EGR amount calculation device for an internal combustion engine, in which, by changing a valve timing of at least one of an intake valve and an exhaust valve, a valve overlap period is changed, and in accordance with the change of the valve overlap period, an internal EGR amount, which is an amount of gas remaining in a cylinder, is changed, comprising blow back gas amount-calculating means for calculating a blow back gas amount, which is an amount of gas which once flowed out of the cylinder into at least one of an intake system and an exhaust system, and thereafter, flows into the cylinder again, overlap center position-calculating means for calculating one of a crank angle position in the center between a starting point and an ending point of the valve overlap period and a crank angle position near the crank angle position in the center, as an overlap center position, corrected blow back gas amount-calculating means for calculating a corrected blow back gas amount by correcting the calculated blow back gas amount according to the calculated overlap center position, and internal EGR amount-calculating means for calculating the internal EGR amount according to the calculated corrected blow back gas amount.

With the configuration of the preferred embodiment, the blow back gas amount is calculated, the overlap center position is calculated, the corrected blow back gas amount is calculated by correcting the calculated blow back gas amount according to the calculated overlap center position, and the internal EGR amount is calculated according to the calculated corrected blow back gas amount. In this case, the overlap center position is one of the crank angle position in the center between the starting point and the ending point of the valve overlap period and the crank angle position near the crank angle position in the center, and hence the overlap center position is calculated as a value representing a crank angle position with respect to the exhaust top dead center. Therefore, the corrected blow back gas amount is calculated by correcting the blow back gas amount according to the thus calculated overlap center position, and hence even if the timing position relationship between the valve overlap period and the exhaust top dead center has changed, it is possible to properly calculate the corrected blow back gas amount while causing such a change in the timing position relationship to be reflected thereon. Further, by calculating the internal EGR amount according to the corrected blow back gas amount thus calculated, it is possible to improve the calculation accuracy of the internal EGR amount.

Preferably, the corrected blow back gas amount-calculating means calculates the corrected blow back gas amount such that as the overlap center position is more retarded from the exhaust top dead center, the corrected blow back gas amount becomes larger, and as the overlap center position is more advanced from the exhaust top dead center, the corrected blow back gas amount becomes smaller.

In general, the engine in which the valve overlap period is changed, as described hereinafter, has characteristics that even if the length of the valve overlap period is the same, when the overlap center position is retarded from the exhaust top dead center, as the degree of retardation is larger, the blow back gas amount becomes larger, and in contrary, when the overlap center position is advanced from the exhaust top dead center, as the degree of advancement is larger, the blow back gas amount becomes smaller. Therefore, with the configuration of the preferred embodiment, it is possible to calculate the corrected blow back gas amount with a higher accuracy while causing such characteristics to be reflected thereon, and thereby further improve the calculation accuracy of the internal EGR amount.

Preferably, the corrected blow back gas amount-calculating means calculates the corrected blow back gas amount such that as the valve overlap period is longer, the corrected blow back gas amount becomes larger.

In general, the engine in which the valve overlap period is changed, as described hereinafter, has characteristics that as the valve overlap period is longer, the blow back gas amount becomes larger. Therefore, with the configuration of the preferred embodiment, it is possible to calculate the corrected blow back gas amount with a higher accuracy while causing such characteristics to be reflected thereon, and thereby further improve the calculation accuracy of the internal EGR amount.

Preferably, the internal EGR amount calculation device further comprises load parameter acquisition means for acquiring a load parameter indicative of load on the engine, and the corrected blow back gas amount-calculating means calculates the corrected blow back gas amount such that as the load on the engine indicated by the acquired load parameter is higher, the corrected blow back gas amount becomes smaller.

Among internal combustion engines, there is one that has characteristics in which the blow back gas amount becomes smaller during high-load operation than during low-load operation (see FIG. 7, referred to hereinafter). In contrast, with the configuration of the preferred embodiment, the corrected blow back gas amount is calculated such that as load on the engine indicated by the acquired load parameter is higher, the corrected blow back gas amount becomes smaller. Therefore, in the engine having the above-mentioned characteristics, it is possible to further improve the calculation accuracy of the corrected blow back gas amount, and as a result, it is possible to further improve the calculation accuracy of the internal EGR amount (note that in the present description, "acquiring" in a phrase "acquiring a load parameter" includes directly detecting the load parameter with a sensor or the like, and estimating the load parameter based on other parameters).

BRIEF DESCRIPTION OF THE DRAWINGS

FIG. 11A is a view showing flows of gas at and near the cylinder when the piston is rising towards the exhaust top dead center, in the case where the overlap center position OVL_Center is set to the point retarded from the exhaust top dead center.

FIG. 11B is a view showing flows of gas at or near the cylinder, when the piston is lowering from the exhaust top dead center, in the case where the overlap center position OVL_Center is set to the point retarded from the exhaust top dead center;

DETAILED DESCRIPTION OF PREFERRED EMBODIMENTS

Figure 1:
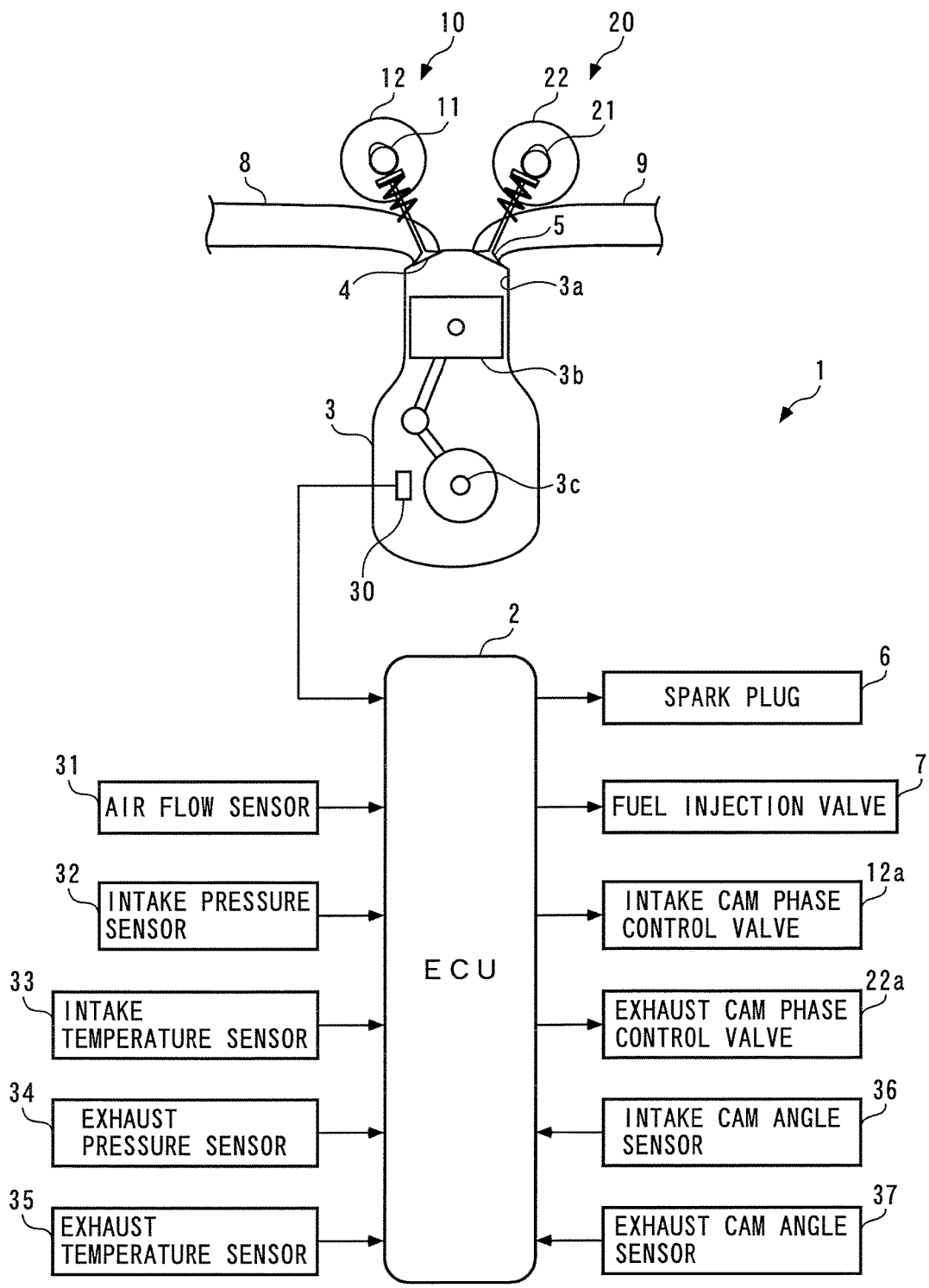
FIG. 1 is a schematic view of an internal EGR amount calculation device according to an embodiment of the present invention and an internal combustion engine to which the internal EGR amount calculation device is applied.

Hereinafter, an internal EGR amount calculation device for an internal combustion engine according to an embodiment of the present invention will be described with reference to drawings. As shown in FIG. 1, the internal EGR amount calculation device 1 includes an ECU 2, and the ECU 2 calculates an internal EGR amount with a technique, described hereinafter, and controls an operating state and the like of an internal combustion engine (hereinafter referred to as the "engine") 3.

The engine 3 is an inline four cylinder gasoline engine having four pairs of cylinders 3a and pistons 3b (only one pair of which is shown) and is installed on a vehicle, not shown. Further, the engine 3 includes intake valves 4 (only one of which is shown) and exhaust valves 5 (only one of which is shown), provided for the cylinders 3a, respectively, an intake valve-actuating mechanism 10 for actuating each intake valve 4 to open and close the same, and an exhaust valve-actuating mechanism 20 for actuating each exhaust valve 5 to open and close the same.

The intake valve-actuating mechanism 10 comprises an intake cam shaft 11 for actuating the intake valve 4, a variable intake cam phase mechanism 12, and so forth. The variable intake cam phase mechanism steplessly (i.e. continuously) changes a relative phase CAIN of the intake cam shaft 11 with respect to a crankshaft 3c (hereinafter referred to as the "intake cam phase CAIN") to an advanced point or a retarded point to thereby change the valve timing of each intake valve 4, and is disposed at an end of the intake cam shaft 11 toward an intake sprocket (not shown).

Figure 2:
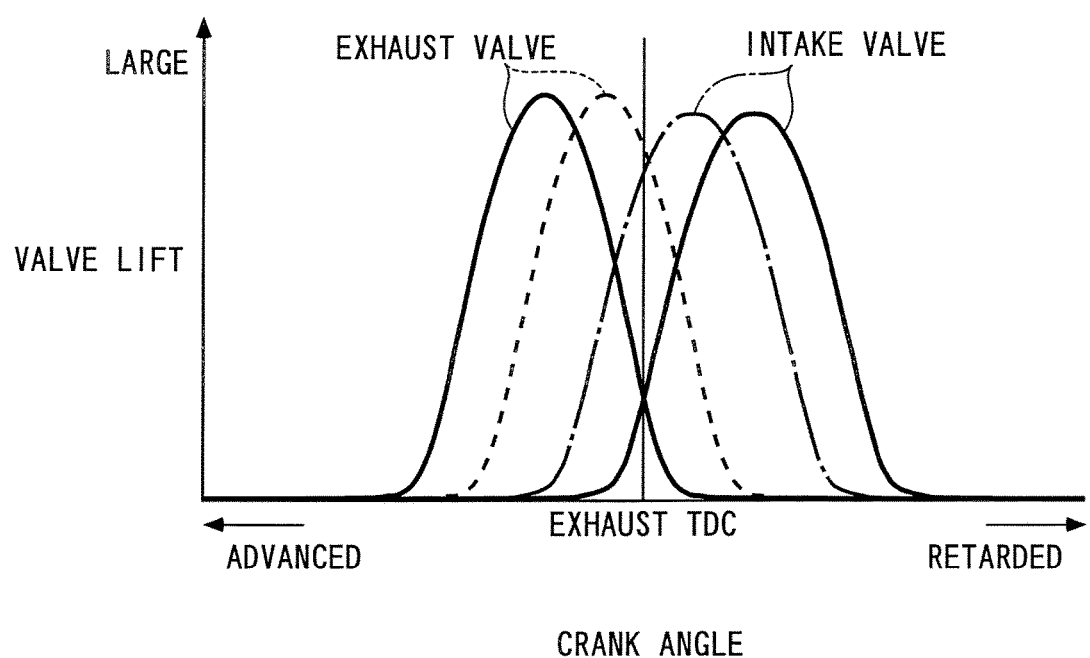
FIG. 2 is a valve lift curve indicating changes in valve timing of an intake valve and that of an exhaust valve caused by a variable intake cam phase mechanism and a variable exhaust cam phase mechanism, respectively.

Although the variable intake cam phase mechanism 12 is configured, specifically, similarly to that proposed in e.g. Japanese Laid-Open Patent Publication (Kokai) No. 2007-100522 by the present assignee, and hence detailed description thereof is omitted, it includes an intake cam phase control valve 12a etc. In the case of the variable intake cam phase mechanism 12, the intake cam phase control valve 12a is controlled by a drive signal from the ECU 2, whereby the intake cam phase CAIN is continuously changed between a predetermined original point value CAIN_0 and a predetermined most advanced value CAIN_ad. This steplessly changes the valve timing of the intake valve 4 between original point timing indicated by a solid line in FIG. 2 and most advanced timing indicated by a one-dot chain line in FIG. 2. Further, in FIG. 2, an exhaust top dead center is denoted as an "exhaust TDC" and this also applies to figures referred to hereinafter.

In this case, the predetermined original point value CAIN_0 is set to 0 and the predetermined most advanced value CAIN_ad is set to a predetermined positive value. Therefore, as the intake cam phase CAIN increases from 0, the valve timing of the intake valves 4 is changed to a more advanced point from the original point timing, and accordingly, a valve overlap period of the intake valve 4 and the exhaust valve 5 becomes longer.

Further, the exhaust valve-actuating mechanism 20 comprises an exhaust camshaft 21 for actuating each exhaust valve 5, a variable exhaust cam phase mechanism 22, and so forth. The variable exhaust cam phase mechanism 22 steplessly (i.e. continuously) changes a relative phase CAEX of the exhaust cam shaft 21 with respect to the crankshaft 3c (hereinafter referred to as the "exhaust cam phase CAEX") to an advanced point or a retarded point to thereby change the valve timing of the exhaust valve 5, and is disposed at an end of the exhaust cam shaft 21 toward an exhaust sprocket (not shown).

The variable exhaust cam phase mechanism 22 is configured similarly to the above-described variable intake cam phase mechanism 12 and includes an exhaust cam phase control valve 22a, etc. In the case of the variable exhaust cam phase mechanism 22, the exhaust cam phase control valve 22a is controlled by a drive signal from the ECU 2, whereby the exhaust cam phase CAEX is continuously changed between a predetermined original point value CAEX_0 and a predetermined most retarded value CAEX_rt. This steplessly changes the valve timing of each exhaust valve 5 between original point timing indicated by a solid line in FIG. 2 and most retarded timing indicated by a dashed line in FIG. 2.

In this case, the predetermined original point value CAEX_0 is set to 0 and the predetermined most retarded value CAEX_rt is set to a predetermined positive value. Therefore, as the exhaust cam phase CAEX increases from 0, the valve timing of the exhaust valve 5 is changed to a more retarded point from the original point timing, and accordingly, the valve overlap period becomes longer.

Further, if such a valve overlap period exists, as will be described hereinafter, an event occurs in which burned gas which once flowed out of the cylinder 3a into an exhaust passage 9 (exhaust system) flows back into the cylinder 3a again, or further flows through the cylinder 3a into an intake passage 8 (intake system), and then flows back into the cylinder 3a again. In the following description, the burned gas which once flows out of the cylinder 3a into the exhaust passage 9 and then finally returns into the cylinder 3a by the termination of the valve overlap period is referred to as the "blow back gas" and the amount thereof is referred to as the "blow back gas amount".

Further, the engine 3 is provided with spark plugs 6, fuel injection valves 7, and a crank angle sensor 30, and the spark plugs 6 and the injection valves 7 (only one of each of which is shown) are both each provided for each cylinder 3a. The fuel injection valve 7 is mounted on an intake manifold such that fuel is injected into an intake port of each cylinder 3a. Both the spark plug 6 and the fuel injection valve 7 are electrically connected to the ECU 2, and a fuel injection amount and fuel injection timing by the fuel injection valve 7 and the ignition timing of a mixture by the spark plug 6 are controlled by the ECU 2. In short, fuel injection control and ignition timing control are thus executed.

Further, the crank angle sensor 30 (load parameter acquisition means) delivers a CRK signal, which is a pulse signal, to the ECU 2 along with rotation of the crankshaft 3c. Each pulse of the CRK signal is delivered whenever the crankshaft 3c rotates through a predetermined crank angle (e.g. 1°) and the ECU 2 calculates a rotational speed NE of the engine 3 (hereinafter referred to as the "engine speed NE") based on this CRK signal.

On the other hand, an air flow sensor 31, an intake pressure sensor 32, an intake temperature sensor 33, an exhaust pressure sensor 34, an exhaust temperature sensor 35, an intake cam angle sensor 36, and an exhaust cam angle sensor 37 are electrically connected to the ECU 2. The air flow sensor 31 (load parameter acquisition means) detects a flow rate of fresh air flowing in the intake passage 8 and delivers a signal indicative of the detected flow rate to the ECU 2. The ECU 2 calculates an intake air amount GAIR based on the detection signal from the air flow sensor 31.

Further, the intake pressure sensor 32 detects a pressure Pin in the intake passage 8 (hereinafter referred to as the "intake pressure Pin") and delivers a signal indicative of the detected intake pressure Pin to the ECU 2. The intake pressure Pin is detected as an absolute pressure. Further, the intake temperature sensor 33 detects a temperature Tin of the air in the intake passage 8 (hereinafter referred to as the "intake temperature Tin") and delivers a signal indicative of the detected intake temperature Tin to the ECU 2. The intake temperature Tin is detected as an absolute temperature.

Also, the exhaust pressure sensor 34 detects a pressure Pex in the exhaust passage 9 (hereinafter referred to as the "exhaust pressure Pex") and delivers a signal indicative of the detected exhaust pressure Pex to the ECU 2. The exhaust pressure Pex is detected as an absolute pressure. Further, the exhaust temperature sensor 35 detects a temperature Tex of the exhaust gas in the exhaust passage 9 (hereinafter referred to as the "exhaust temperature Tex") and delivers a signal indicative of the detected exhaust temperature Tex to the ECU 2. The exhaust temperature Tex is detected as an absolute temperature.

Further, the intake cam angle sensor 36 is disposed at an end of the intake cam shaft 11 on a side thereof remote from the variable intake cam phase mechanism 12 and delivers an intake CAM signal, which is a pulse signal, to the ECU 2 along with rotation of the intake cam shaft 11 whenever the intake cam shaft 11 rotates through a predetermined cam angle (e.g. 1°). The ECU 2 calculates the intake cam phase CAIN based on the intake CAM signal and the above-mentioned CRK signal.

Further, the exhaust cam angle sensor 37 is disposed at an end of the exhaust cam shaft 21 on a side thereof remote from the variable exhaust cam phase mechanism 22 and delivers an exhaust CAM signal, which is a pulse signal, to the ECU 2 along with rotation of the exhaust cam shaft 21 whenever the exhaust cam shaft 21 rotates through a predetermined cam angle (e.g. 1°). The ECU 2 calculates the exhaust cam phase CAEX based on the exhaust CAM signal and the above-mentioned CRK signal.

The ECU 2 is implemented by a microcomputer comprising a CPU, a RAM, a ROM, and an I/O interface (none of which are specifically shown), and, based on the detection signals from the above-mentioned various sensors 30 to 37, as will be described hereinafter, executes a process for calculating the internal EGR amount, and also controls operating conditions of the spark plug 6, the fuel injection valve 7, the intake cam phase control valve 12a, and the exhaust cam phase control valve 22a.

Note that, in the present embodiment, the ECU 2 corresponds to blow back gas amount-calculating means, overlap center position-calculating means, corrected blow back gas amount-calculating means, internal EGR amount-calculating means, and load parameter acquisition means.

Figure 3:
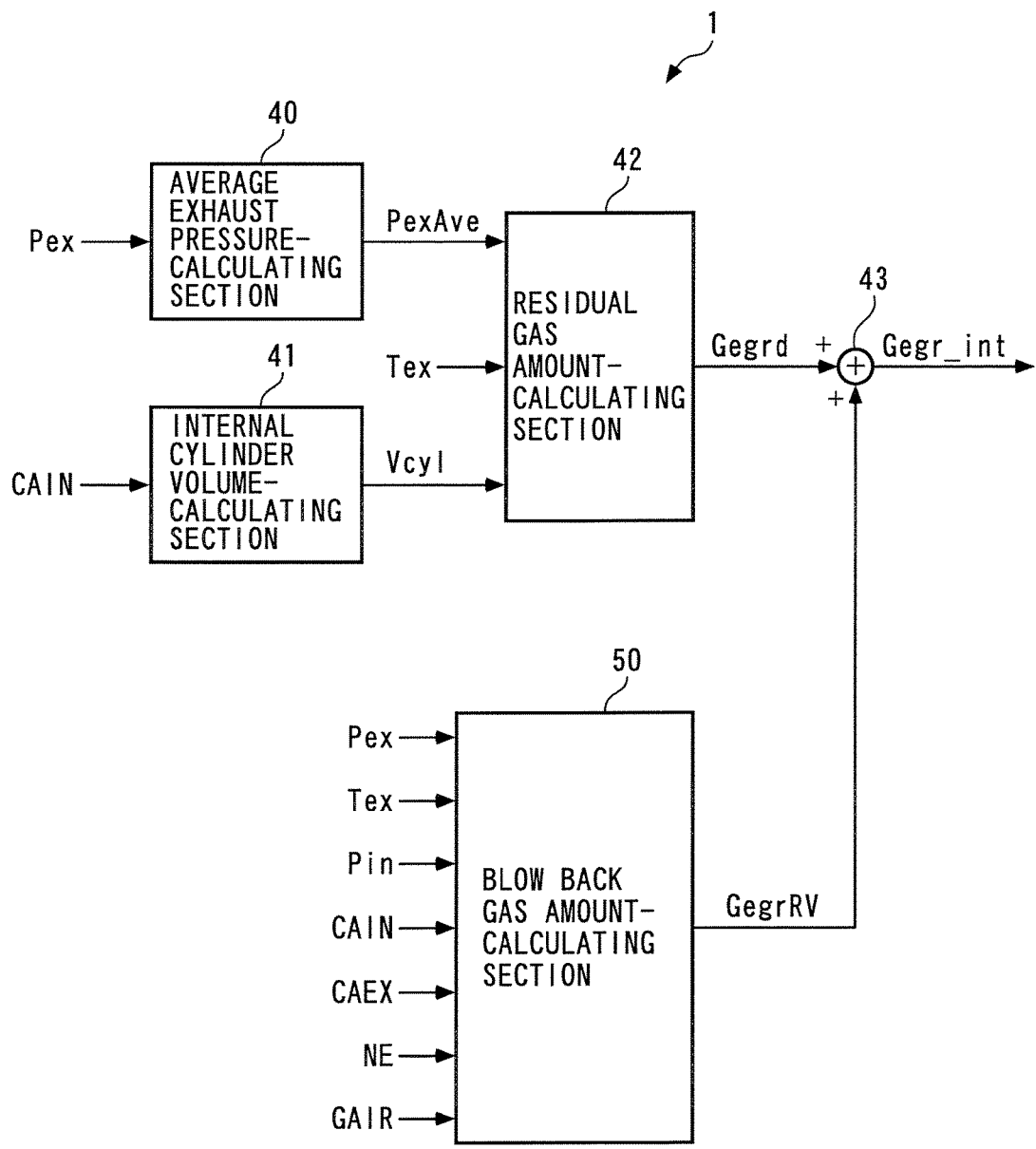
FIG. 3 is a functional block diagram of the internal EGR amount calculation device.

Next, a functional configuration of the internal EGR amount calculation device 1 according to the embodiment will be described with reference to FIG. 3. As shown in FIG. 3, the internal EGR amount calculation device 1 includes an average exhaust pressure-calculating section 40, an internal cylinder volume-calculating section 41, a residual gas amount-calculating section 42, an adder 43 and a blow back gas amount-calculating section 50, all of which are implemented by the ECU 2. Note that, in the embodiment, the residual gas amount-calculating section 42 and the adder 43 correspond to the internal EGR amount-calculating means, and the blow back gas amount-calculating section 50 corresponds to the corrected blow back gas amount-calculating means.

The average exhaust pressure-calculating section 40 calculates an average exhaust pressure PexAve as a moving average of a predetermined number of values of the exhaust pressure Pex sampled at a predetermined repetition period.

Further, the internal cylinder volume-calculating section 41 calculates an internal cylinder volume Vcyl by searching a table, not shown, according to the intake cam phase CAIN. The internal cylinder volume Vcyl is a volume in the cylinder 3a at a valve-opening timing of the intake valve 4, and has characteristics that it is dependent on the valve-opening timing of the intake valve 4. Therefore, in the embodiment, the internal cylinder volume Vcyl is calculated, using the intake cam phase CAIN that decides the valve-opening timing of the intake valve 4, and a method of searching a table according to the intake cam phase CAIN.

Further, the residual gas amount-calculating section 42 calculates a residual gas amount Gegrd by the following equation (1):

$$Gegrd = \frac{PexAve \cdot Vcyl}{Re \cdot Tex} \quad (1)$$

The equation (1) corresponds to the equation of state of gas and Re in the equation (1) represents a gas constant. The residual gas amount Gegrd corresponds to an amount of burned gas remaining in the cylinder 3a immediately before the intake valve 4 is opened.

Further, the blow back gas amount-calculating section 50 calculates a blow back gas amount GegrRV, using various parameters, such as the exhaust pressure Pex and the exhaust temperature Tex, by a method described hereinafter.

Then, the adder 43 calculates the internal EGR amount, denoted by Gegr_int, by the following equation (2):

$$Gegr\_int = Gegrd + GegrRV \quad (2)$$

As shown in the above equation (2), the internal EGR amount calculation device 1 calculates the internal EGR amount Gegr_int as the sum of the residual gas amount Gegrd and the blow back gas amount GegrRV.

Figure 4:
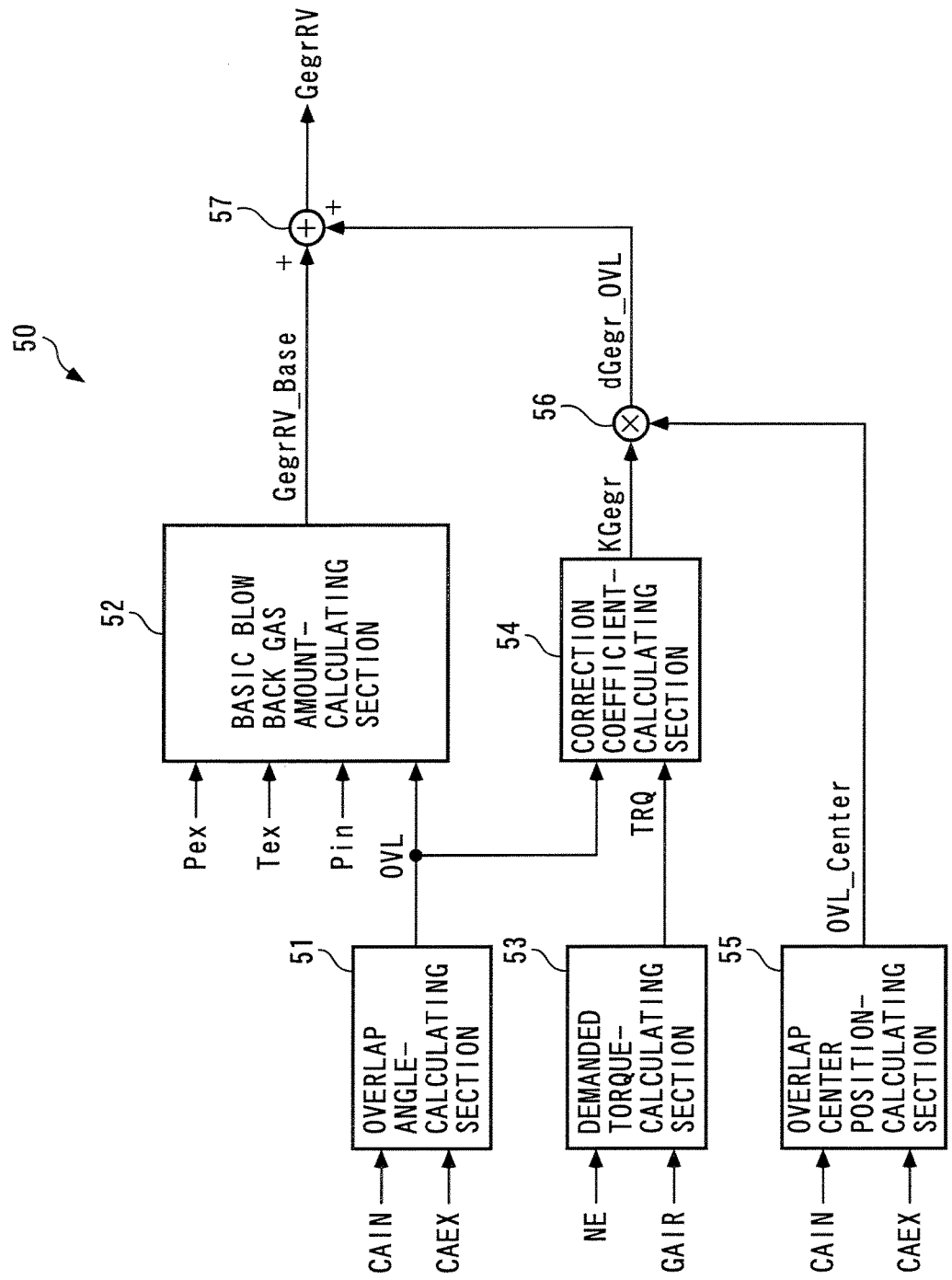
FIG. 4 is a block diagram of a blow back gas amount-calculating section.

Next, the above-mentioned blow back gas amount-calculating section 50 will be described with reference to FIG. 4. As shown in FIG. 4, the blow back gas amount-calculating section 50 includes an overlap angle-calculating section 51, a basic blow back gas amount-calculating section 52, a demanded torque-calculating section 53, a correction coefficient-calculating section 54, an overlap center position-calculating section 55, a multiplier 56, and an adder 57.

Note that, in the embodiment, the basic blow back gas amount-calculating section 52 corresponds to the blow back gas amount-calculating means, the demanded torque-calculating section 53 corresponds to the load parameter acquisition means, and the overlap center position-calculating section 55 corresponds to the overlap center position-calculating means.

First, the overlap angle-calculating section 51 calculates an overlap angle OVL by the following equation (3).

$$OVL = CAIN + CAEX \quad (3)$$

As shown in the above equation (3), the overlap angle OVL is calculated as the sum of the intake cam phase CAIN and the exhaust cam phase CAEX, and hence, when CAIN=CAEX=0, it becomes 0, and when CAIN=CAIN_ad and CAEX=CAEX_rt, it becomes a maximum value OVLmax. Thus, the overlap angle OVL is calculated, using a value of the valve overlap period occurring when CAIN=CAEX=0 as a reference, and in terms of a crank angle corresponding to an increase from the reference. In other words, the overlap angle OVL is calculated as a larger value as the valve overlap period is longer.

Further, the basic blow back gas amount-calculating section 52 calculates a basic blow back gas amount GegrRV_Base (blow back gas amount) by the following equations (4) to (6). The basic blow back gas amount GegrRV_Base corresponds to a blow back gas amount occurring when CAIN=CAEX is satisfied.

$$\text{GegrRv\_Base} = CdA \cdot \frac{Pex}{\sqrt{Re \cdot Tex}} \cdot \Psi \qquad (4)$$

When $\frac{Pin}{Pex} > \left(\frac{2}{\kappa+1}\right)^{\frac{\kappa}{\kappa-1}}$ $$\Psi = \sqrt{\frac{2\kappa}{\kappa-1}\left\{\left(\frac{Pin}{Pex}\right)^{\frac{2}{\kappa}} - \left(\frac{Pin}{Pex}\right)^{\frac{\kappa+1}{\kappa}}\right\}} \qquad (5)$$

When $\frac{Pin}{Pex} \leq \left(\frac{2}{\kappa+1}\right)^{\frac{\kappa}{\kappa-1}}$ $$\Psi = \sqrt{\kappa\left(\frac{2}{\kappa+1}\right)^{\frac{\kappa+1}{\kappa-1}}} \qquad (6)$$

Figures 5, 6:
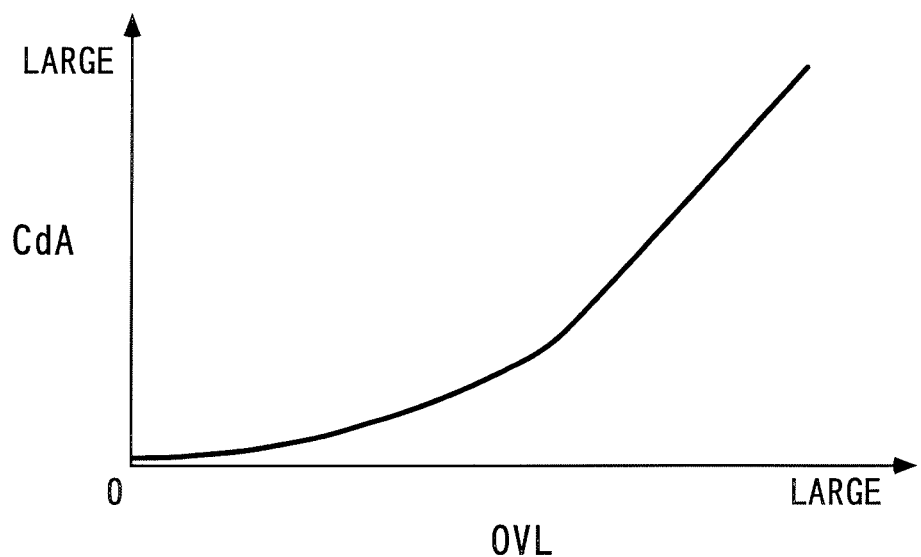
FIG. 5 is an example of a map for use in calculating a function value CdA.
FIG. 6 is a view showing an example of a map for use in calculating a demanded torque TRQ.

CdA in the above equation (4) represents a function value corresponding to the product of an effective opening area and a flow rate coefficient, and the function value CdA is calculated specifically by searching a map shown in FIG. 5 according to the overlap angle OVL. Further, Ψ in the above equation (4) represents a flow rate function calculated by the equations (5) and (6), and κ in the equations (5) and (6) represents a specific heat ratio. In this case, the above equations (4) to (6) are derived by regarding the blow back gas (i.e. burned gas) as an adiabatic flow of a compressible fluid, and a flow passage through which the blow back gas flows as a nozzle, and using the nozzle equation. A method of deriving the equations (4) to (6) is the same as described e.g. in Japanese Laid-Open Patent Publication (Kokai) No. 2011-140895 by the present applicant, and hence, description thereof is omitted.

Further, the above-mentioned demanded torque-calculating section 53 calculates a demanded torque TRQ by searching a map appearing in FIG. 6 according to the engine speed NE and the intake air amount GAIR. In FIG. 6, GAIR1-$i$ ($i$ is a positive integer) represents a predetermined value of the intake air amount GAIR satisfying GAIR1< . . . <GAIR1-$i$, and, NE1-$j$ (j is a positive integer) represents a predetermined value of the engine speed NE satisfying NE1< . . . <NEj.

Figure 7:
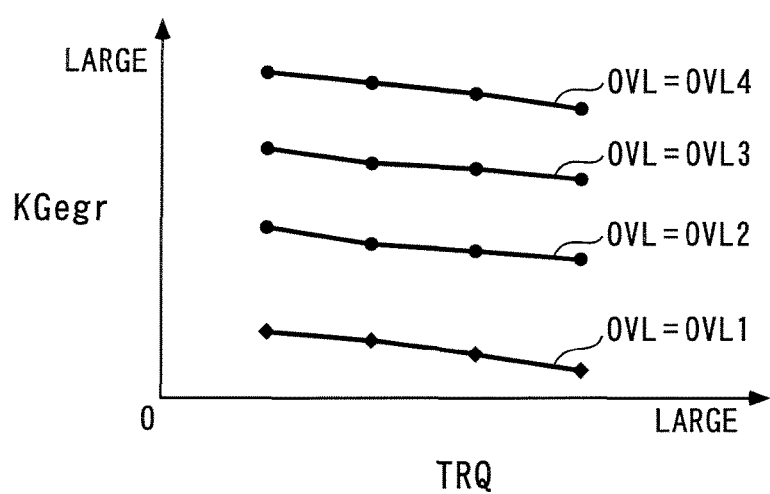
FIG. 7 is a view showing an example of a map for use in calculating a correction coefficient KGegr.

On the other hand, the correction coefficient-calculating section 54 calculates a correction coefficient KGegr by searching a map shown in FIG. 7 according to the overlap angle OVL and the demanded torque TRQ. In FIG. 7, OVL1 to OVL4 represent respective predetermined values of the overlap angle OVL satisfying OVL1<OVL2<OVL3<OVL4. As shown in FIG. 7, in this map, as the demanded torque TRQ is larger, the correction coefficient KGegr is set to a smaller value, and as the overlap angle OVL is larger, the correction coefficient KGegr is set to a larger value. The reason for this will be described hereinafter.

Further, the overlap center position-calculating section 55 calculates an overlap center position OVL_Center by the following equation (7). The overlap center position OVL_Center represents a crank angle position in the center between the starting point and the ending point of the valve overlap period.

$$\text{OVL\_Center} = \frac{CAEX - CAIN}{2} \qquad (7)$$

As is clear by referring to the above equation (7), the overlap center position OVL_Center becomes 0 when CAEX=CAIN=0 is satisfied, which means that it is at the exhaust top dead center, it becomes a negative value when CAEX<CAIN is satisfied, which means that it is advanced with respect to the exhaust top dead center, and it becomes a positive value when CAEX>CAIN is satisfied, which means that it is retarded with respect to the exhaust top dead center.

Further, the multiplier 56 calculates a correction term dGegr_OVL by the following equation (8):

$$dGegr\_OVL = KGegr \cdot OVL\_Center \qquad (8)$$

As shown in the above equation (8), the correction term dGegr_OVL is calculated by multiplying the overlap center position OVL_Center by the correction coefficient KGegr. The reason for this will be described hereinafter.

Then, the adder 57 calculates the blow back gas amount GegrRV (corrected blow back gas amount) by the following equation (9):

$$GegrRV = GegrRV\_Base + dGegr\_OVL \qquad (9)$$

As described above, the blow back gas amount GegrRV is calculated by correcting the basic blow back gas amount GegrRV_Base by the correction term dGegr_OVL. Hereafter, the reason and theory for this will be described.

First, examples of measurement results of the intake flow rate and the exhaust flow rate, flows of gas in the intake passage 8, the cylinder 3a and the exhaust passage 9, and so forth, in a case where the overlap center position OVL_Center is set to a point advanced from the exhaust top dead center, will be described with reference to FIGS. 8A, 8B, 9A, and 9B.

Further, in FIGS. 8A and 8B, and FIGS. 10A and 10B, referred to hereinafter, the intake flow rate and the exhaust flow rate flowing downstream are expressed as positive values and those flowing back upstream are expressed as negative values. Further, in FIGS. 9A and 9B, and FIGS. 11A and 11B, referred to hereinafter, hatched arrows indicate respective directions of flows of burned gas and dotted arrows indicate respective directions of flows of fresh air, respectively.

Figure 8A:
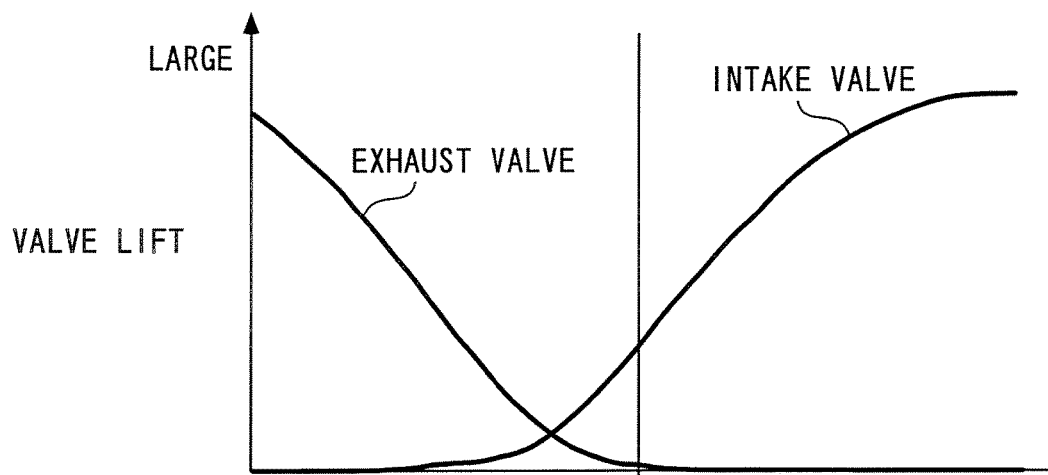
FIG. 8A is a diagram showing respective valve lift curves of the intake valve and the exhaust valve, in a case where an overlap center position OVL_Center is set to a point advanced from the exhaust top dead center.
Figure 8B:
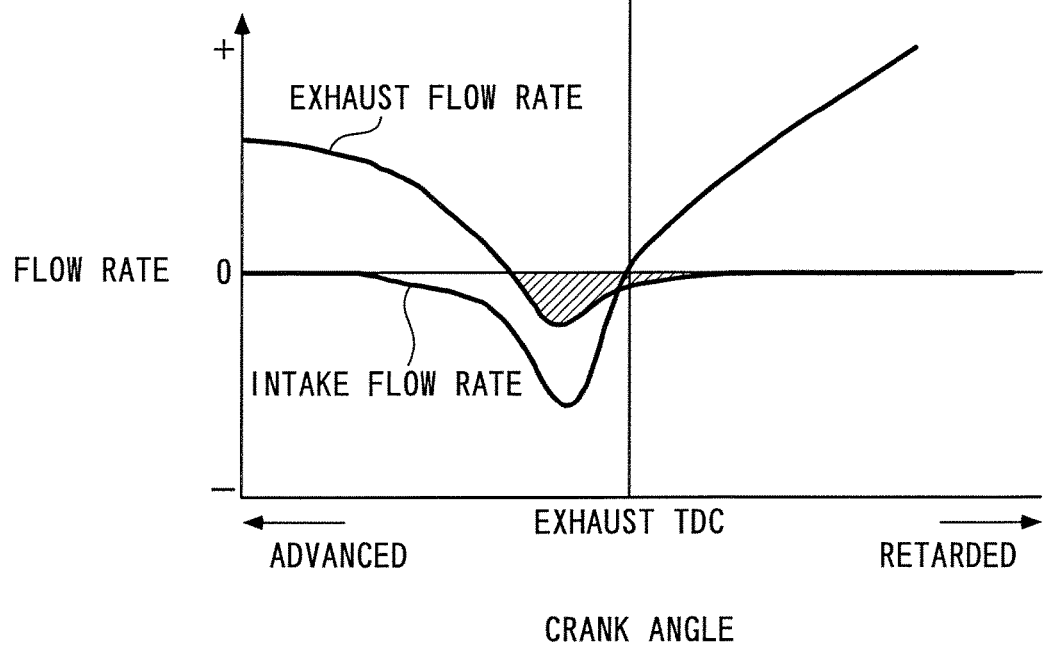
FIG. 8B is a diagram showing an example of respective measurement results of the intake flow rate and the exhaust flow rate, in the case where the overlap center position OVL_Center is set to the point advanced from the exhaust top dead center.
Figure 9A:
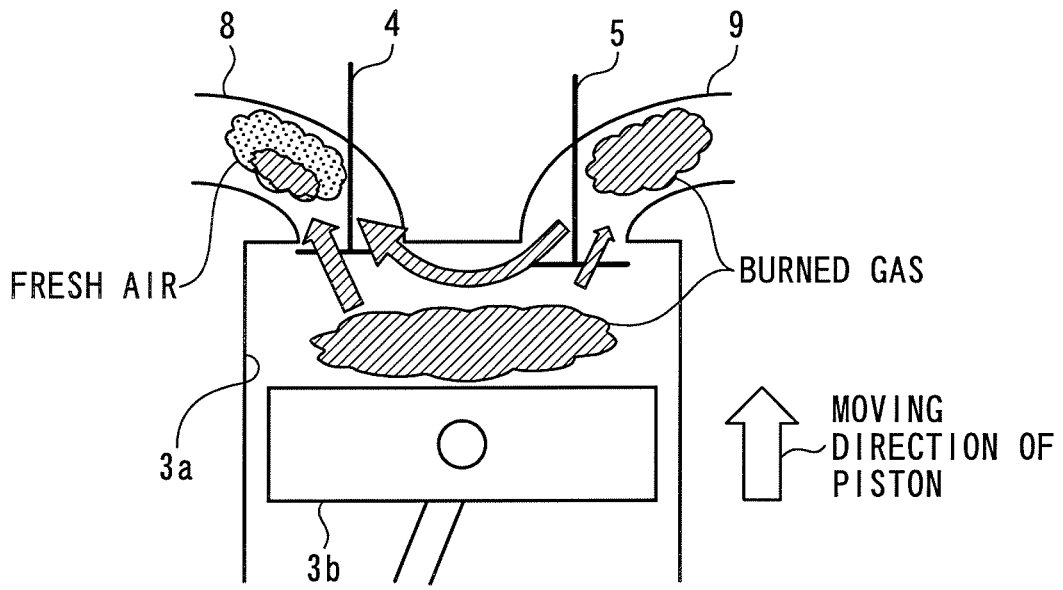
FIG. 9A is a view showing flows of gas at and near a cylinder when a piston is rising towards the exhaust top dead center, in a case where the overlap center position OVL_Center is set to a point advanced from the exhaust top dead center.

FIG. 8A and FIG. 8B show an example in which the intake valve 4 begins to open at a timing advanced from the exhaust top dead center during opening of the exhaust valve 5, in a case where the overlap center position OVL_Center is set to a point advanced from the exhaust top dead center by a predetermined value. In this case, at the timing that the intake valve 4 begins to open, the piston 3b is rising, and in addition, the intake pressure Pin becomes lower than the exhaust pressure Pex, so that as shown in FIG. 9A, part of burned gas in the cylinder 3a flows back into the intake passage 8, and part of burned gas in the exhaust passage 9, after returning to the cylinder 3a, also flows back into the intake passage 8. This causes, as shown in FIG. 8B, not only the intake flow rate but also the exhaust flow rate to become negative values.

Figure 9B:
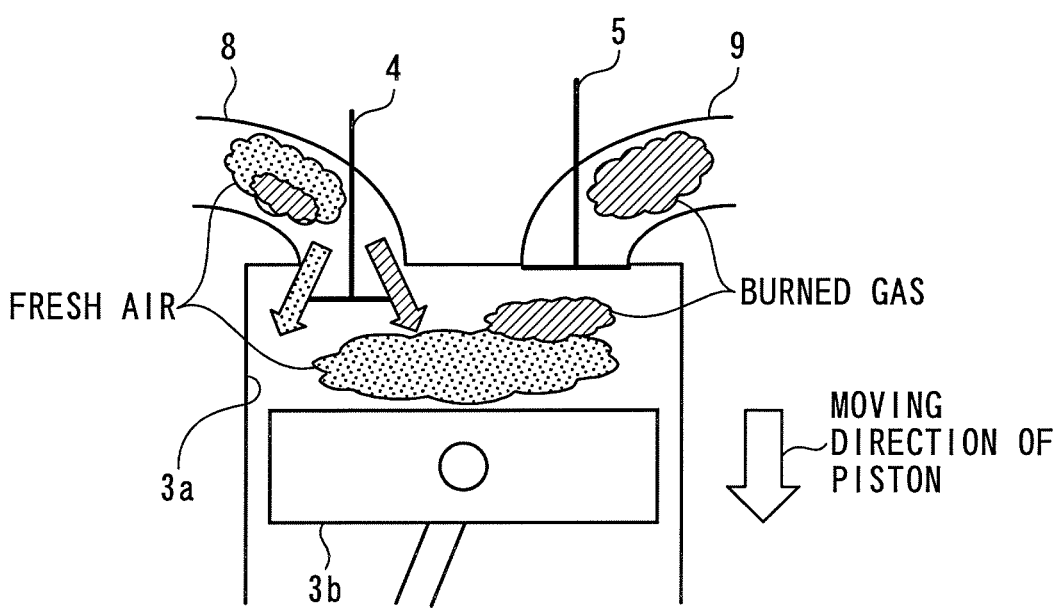
FIG. 9B is a view showing flows of gas at or near the cylinder, when the piston is lowering from the exhaust top dead center, in the case where the overlap center position OVL_Center is set to the point advanced from the exhaust top dead center.

Subsequently, at a timing that the piston is past the exhaust top dead center, the exhaust valve 5 is closed, the piston begins to lower, and the intake valve 4 is opened, and accordingly, as shown in FIG. 9B, fresh air in the intake passage 8 and the burned gas flow into the cylinder 3a. This causes, as shown in FIG. 8B, the exhaust flow rate to become 0 and the intake flow rate to increase.

As described above, burned gas which once flowed out of the cylinder 3a into the exhaust passage 9 flows back into the cylinder 3a again, or further flows through the cylinder 3a into the intake passage 8, and then flows back into the cylinder 3a again. That is, the blow back gas is generated and the blow back gas amount is proportional to an area of a region where the exhaust flow rate has negative values (a hatched region in FIG. 8B).

Next, examples of measurement results of the intake flow rate and the exhaust flow rater, flows of gas in the intake passage 8, the cylinder 3a, and the exhaust passage 9, and so forth, in a case where the overlap center position OVL_Center is set to a point retarded from the exhaust top dead center, will be described with reference to FIGS. 10A, 10B, 11A, and 11B. Note that, in FIGS. 10A and 10B, the length of the valve overlap period is set to be the same as that in FIGS. 8A and 8B, and the overlap center position OVL_Center is set to a point retarded from the exhaust top dead center by the above-mentioned predetermined value, in contrast to the example in FIGS. 8A and 8B.

Figure 10A:
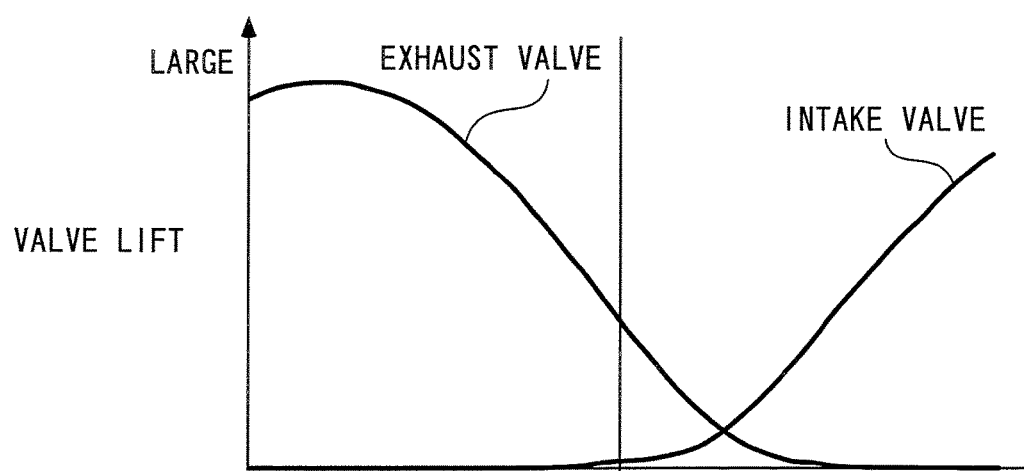
FIG. 10A is a diagram showing respective valve lift curves of the intake valve and the exhaust valve, in a case where the overlap center position OVL_Center is set to a point retarded from the exhaust top dead center.
Figure 10B:
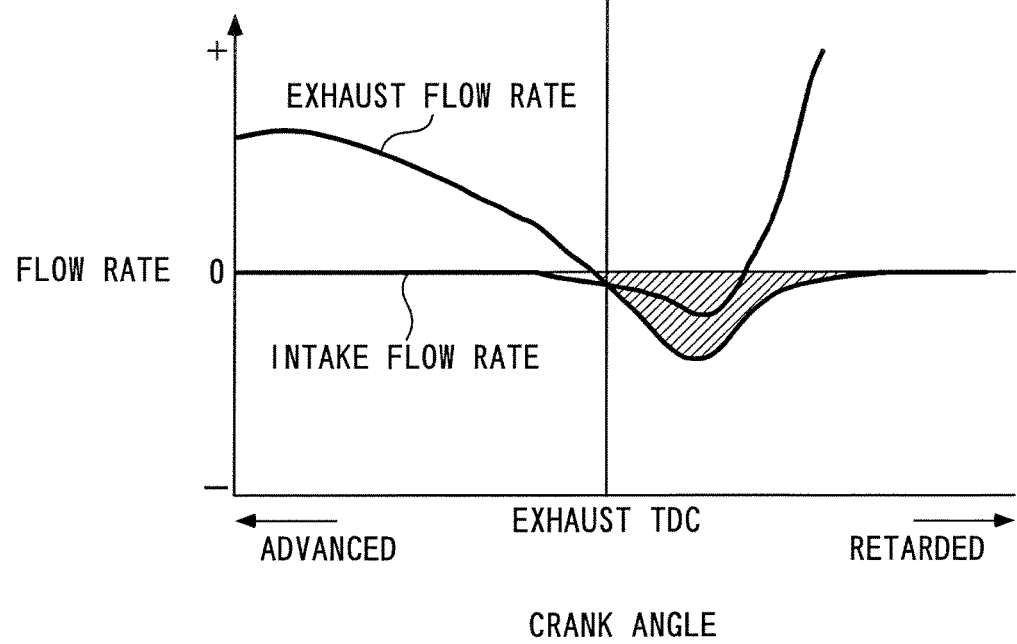
FIG. 10B is a diagram showing an example of respective measurement results of the intake flow rate and the exhaust flow rate, in the case where the overlap center position OVL_Center is set to the point retarded from the exhaust top dead center.

In the examples shown in FIGS. 10A, 10B, 11A, and 11B, during opening of the exhaust valve 5, the intake valve 4 begins to open a little before the exhaust top dead center, and in this case, at the timing before the intake valve 4 begins to open, as shown in FIG. 11A, the piston 3b is rising, and in addition, the intake valve 4 is in a close state, so that the burned gas in the cylinder 3a flows only into the exhaust passage 9. This cases, as shown in FIG. 10B, the exhaust flow rate to indicate a positive value and the intake flow rate to become 0.

Further, as the piston 3b rises and approaches towards the exhaust top dead center, the lift of the exhaust valve 5 lowers and the intake valve 4 begins to open. Accordingly, part of burned gas in the exhaust passage 9 begins to flow back into the cylinder 3a and part of burned gas in the cylinder 3a begins to flow back into the intake passage 8. This causes, as shown in FIG. 10B, both the exhaust flow rate and the intake flow rate to indicate negative values.

Subsequently, at a timing retarded from the exhaust top dead center, the lift of the exhaust valve 5 decreases, the piston lowers, and the lift of the intake valve 4 increases. Accordingly, as shown in FIG. 11B, fresh air and the burned gas in the intake passage 8 flow into the cylinder 3a, and part of burned gas in the exhaust passage 9 also flows into the cylinder 3a. This causes, as shown in FIG. 10B, the exhaust flow rate and the intake flow rate to temporarily increase sharply. Subsequently, in accordance with closing the exhaust valve 5, the intake flow rate increases and the exhaust flow rate becomes 0.

As described above, the burned gas which flowed out of the cylinder 3a into the exhaust passage 9 flows back into the cylinder 3a again, or further flows through the cylinder 3a into the intake passage 8, and then flows back into the cylinder 3a again. That is, the blow back gas is generated and the blow back gas amount is proportional to an area of a region where the exhaust flow rate has negative values (a hatched region in FIG. 10B).

In this case, as is clear from comparison of areas of the hatched regions in FIG. 8B and FIG. 10B, it is understood that the area in FIG. 10B is larger and the blow back gas amount GegrRV is larger. That is, it is understood that even if the length of the valve overlap period is the same, the blow back gas amount GegrRV is larger when the overlap center position OVL_Center is set to a point retarded from the exhaust top dead center than when it is set to a point advanced therefrom. It is presumed that in the case where the overlap center position OVL_Center is set to a point retarded from the exhaust top dead center, the burned gas flows directly into the cylinder 3a from the exhaust passage 9, as described hereinbefore, and hence, the blow back gas amount GegrRV becomes larger than in the case where the overlap center position OVL_Center is set a point advanced from the exhaust top dead center.

Figure 12:
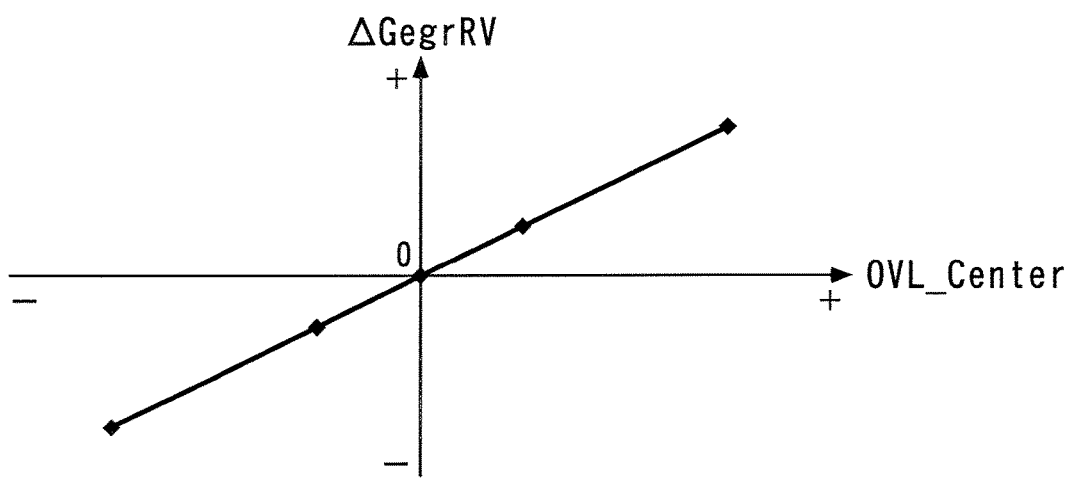
FIG. 12 is a view showing an example of a measurement result of a relationship between the overlap center position OVL_Center and a blow back gas change amount $\Delta$GegrRV.

Then, based on the above-described findings, a relation between the overlap center position OVL_Center and a blow back gas change amount ΔGegrRV was measured to give an example of the measurement result shown in FIG. 12. The blow back gas change amount ΔGegrRV is a value calculated by the equation ΔGegrRV=GegrRV−GegrRV_Base. That is, the blow back gas change amount ΔGegrRV corresponds to an amount of change in the blow back gas amount GegrRV from the above-mentioned basic blow back gas amount GegrRV_Base.

As is clear by referring to FIG. 12, it is understood that the blow back gas change amount ΔGegrRV has linearity with respect to the overlap center position OVL_Center. In other words, it is understood that the engine 3 has characteristics that even if the length of the valve overlap period is the same, when the overlap center position OVL_Center is retarded from the exhaust top dead center, the blow back gas amount GegrRV further increases as the degree of retardation is larger, and in contrast, when the overlap center position OVL_Center is advanced from the exhaust top dead center, the blow back gas amount GegrRV further decreases as the degree of advancement is larger. Therefore, it is understood that when the overlap center position OVL_Center has changed from 0, a correction value for correcting the basic blow back gas amount GegrRV_Base may be calculated by multiplying the overlap center position OVL_Center by a correction coefficient.

Figure 13:
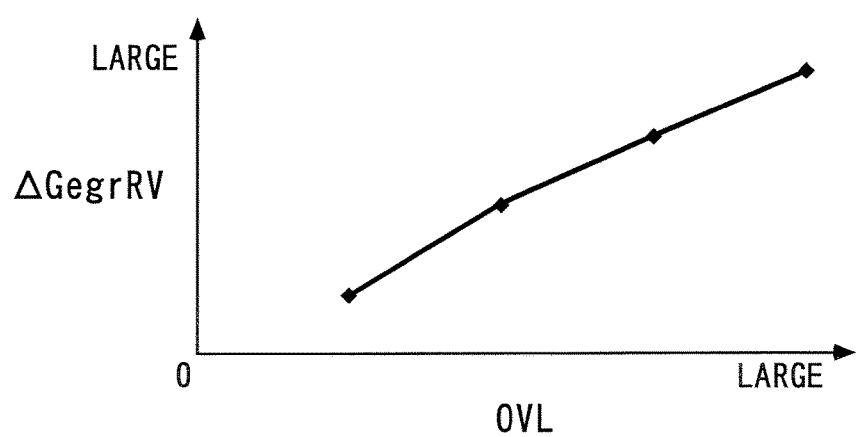
FIG. 13 is a view showing an example of a measurement result of a relationship between an overlap angle OVL and the blow back gas change amount $\Delta$GegrRV.

In addition to this, the relation between the overlap angle OVL and the blow back gas change amount ΔGegrRV was measured to give an example of the measurement result shown in FIG. 13. As is clear by referring to FIG. 13, it is understood that the blow back gas change amount ΔGegrRV becomes larger as the overlap angle OVL is larger. Further, a relation between the blow back gas change amount ΔGegrRV and the demanded torque TRQ was measured, and although illustration of the measurement result is omitted, it has been found that as the demanded torque TRQ is larger, the blow back gas change amount ΔGegrRV becomes smaller.

Based on the above-mentioned reasons and theory, in the case of the present embodiment, the correction coefficient KGegr is calculated by the method of searching the map described with reference to FIG. 7 according to the overlap angle OVL and the demanded torque TRQ, and the correction term dGegr_OVL is calculated by the method of multiplying the overlap center position OVL_Center by the correction coefficient KGegr. Then, the blow back gas change amount ΔGegrRV is finally calculated by the method of correcting the basic blow back gas amount GegrRV_Base with the correction term dGegr_OVL.

Figure 14:
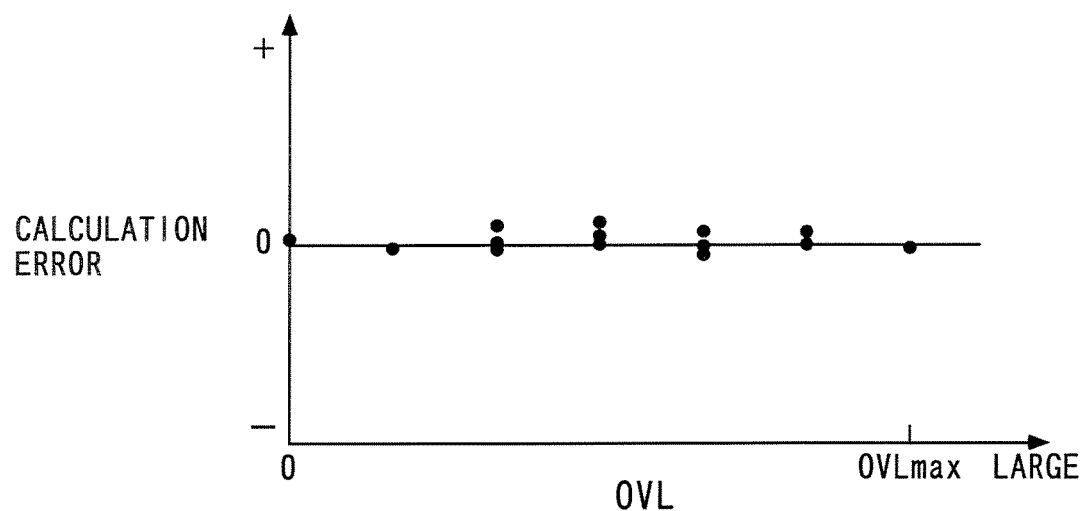
FIG. 14 is a diagram showing a calculation error of an internal EGR amount Gegr_int by the internal EGR amount calculation device according to the present embodiment.

Next, the accuracy of a calculation result of the internal EGR amount Gegr_int by the internal EGR amount calculation device 1 according to the embodiment will be described with reference to FIG. 14 and FIG. 15. FIG. 14 shows a relationship between a calculation error of the internal EGR amount Gegr_int by the internal EGR amount calculation device 1 according to the present embodiment and the overlap angle OVL, and the calculation error represents, in percentage terms, a difference between a calculation result of the internal EGR amount Gegr_int and an actual value thereof. Further, FIG. 15 shows, for comparison, a relationship between the calculation error of the internal EGR amount Gegr_int and the overlap angle OVL when the correction term dGegr_OVL=0, that is, when the calculation result of the internal EGR amount Gegr_int is made equal to the basic blow back gas amount GegrRV_Base.

Figure 15:
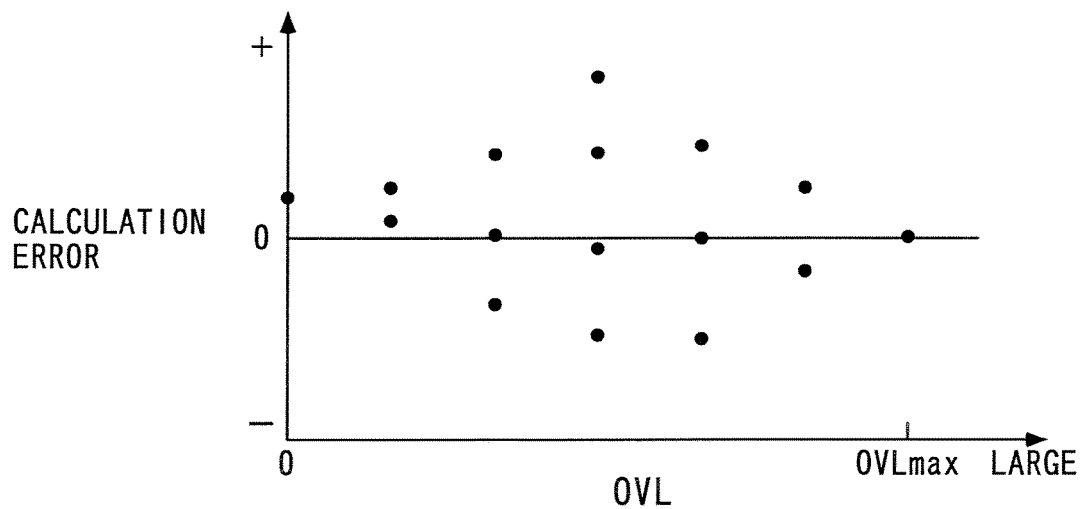
FIG. 15 is a diagram showing, for comparison, a calculation error of the internal EGR amount Gegr_int when a correction term dGegr_OVL=0.

As is clear from a comparison of FIG. 14 and FIG. 15, it is understood that in a range of overlap angle OVL from 0 to OVLmax, the calculation result of the embodiment has far smaller calculation errors than the calculation result shown in FIG. 15. That is, it is understood that by using the correction term dGegr_OVL as in the method of calculation of the internal EGR amount Gegr_int employed in the present embodiment, the calculation accuracy is improved compared with a case of not using the correction term dGegr_OVL.

As described above, according to the internal EGR amount calculation device 1 according to the embodiment, the correction term dGegr_OVL is calculated by multiplying the correction coefficient KGegr by the overlap center position OVL_Center, and the blow back gas amount GegrRV is calculated by correcting the basic blow back gas amount GegrRV_Base by the correction term dGegr_OVL.

In this case, the overlap center position OVL_Center is a crank angle position in the center between the starting point and the ending point of the valve overlap period, and is calculated as a value indicative of a crank angle position with respect to the exhaust top dead center. Then, the blow back gas amount GegrRV is calculated using the overlap center position OVL_Center, and hence even when a timing position relationship between the valve overlap period and the exhaust top dead center changes in accordance with changes in the intake cam phase CAIN and the exhaust cam phase CAEX, it is possible to calculate the blow back gas amount GegrRV appropriately while reflecting such a change in the timing position relationship. Further, by calculating the internal EGR amount Gegr_int using the thus calculated blow back gas amount GegrRV, it is possible to improve the calculation accuracy of the internal EGR amount Gegr_int.

Further, the engine 3 has characteristics that even if the length of the valve overlap period is the same, when the overlap center position OVL_Center is retarded from the exhaust top dead center, the blow back gas amount GegrRV further increases as the degree of retardation is larger, and in contrast, when the overlap center position OVL_Center is advanced from the exhaust top dead center, the blow back gas amount GegrRV further decreases as the degree of advancement is larger. In addition to this, as mentioned hereinabove, the engine 3 has characteristics that as the valve overlap period is longer, the blow back gas amount GegrRV increases, and characteristics that the blow back gas amount GegrRV becomes smaller during high-load operation than during low-load operation.

In view of this, the correction coefficient KGegr is calculated using the map shown in FIG. 7 and the correction term dGegr_OVL is calculated by multiplying the overlap center position OVL_Center by the thus calculated correction coefficient KGegr, and hence it is possible to calculate the blow back gas amount GegrRV with a higher accuracy while causing the above-mentioned characteristics to be reflected thereon. This makes it possible to further improve the calculation accuracy of the internal EGR amount Gegr_int.

Note that although in the embodiment, the engine 3 with the variable intake cam phase mechanism 12 and the variable exhaust cam phase mechanism 22 is used as the engine in which the valve timing of at least one of the intake valve 4 and the exhaust valve 5 is changed, by way of example, the engine to which the internal EGR amount calculation device according to the present invention is not limited to this, but any suitable internal combustion engine may be used insofar as the valve timing of an intake and/or exhaust valve can be changed. For example, as the engine, an internal combustion engine comprising one of the variable intake cam phase mechanism 12 and the variable exhaust cam phase mechanism 22 may be used, and an internal combustion engine may be used in which by a mechanism other than these, the valve timing of the intake valve and/or the exhaust valve 5 is changed. For example, as a mechanism for changing the cam phase, it is possible to use a variable cam phase mechanism of a type in which an electric motor and a gear mechanism are combined, an electromagnetic valve-operating mechanism in which a valve element is actuated by a solenoid, a variable valve timing mechanism which the valve timing is mechanically changed by a three-dimensional cam, etc.

Further, though in the embodiment, the internal EGR amount calculation device 1 according to the present invention is applied to the engine 3 for a vehicle, by way of example, the internal EGR amount calculation device 1 according to the present invention is not limited to this, but it can be applied to internal combustion engines for boats and internal combustion engines for other industrial machines.

Further, though in the embodiment, as the overlap center position OVL_Center, the crank angle position in the center between the starting point and the ending point of the valve overlap period is used, by way of example, the overlap center position OVL_Center in the present invention is not limited to this, but a crank angle position near the crank angle position in the center between the starting point and the ending point of the valve overlap period may be used. If thus configured, it is possible to obtain similar operational effects to the embodiment.

Further, although in the embodiment, as the load parameter acquisition means, the ECU 2, the crank angle sensor 30, and the air flow sensor 31 are used, by way of example, the load parameter acquisition means in the present invention is not limited to this, but any suitable one may be used insofar as it can acquire a load parameter indicative of load. For example, as the load parameter acquisition means, an accelerator pedal opening sensor for detecting an accelerator pedal opening and the ECU 2 may be used, and the ECU 2 may calculate the load parameter according to a detection signal from the accelerator pedal opening sensor.

Further, although in the embodiment as the correction value for correcting the basic blow back gas amount GegrRV_Base, the correction term dGegr_OVL, which is an addition term, is used, byway of example, instead of this, internal EGR amount calculation device may be configured such that the blow back gas amount GegrRV is calculated by multiplying the basic blow back gas amount GegrRV_Base by a correction coefficient.

It is further understood by those skilled in the art that the foregoing are preferred embodiments of the invention, and that various changes and modifications may be made without departing from the spirit and scope thereof.

What is claimed is:
1. An internal EGR amount calculation device for an internal combustion engine, in which, by changing a valve timing of at least one of an intake valve and an exhaust valve, a valve overlap period is changed, and in accordance with the change of the valve overlap period, an internal EGR amount, which is an amount of gas remaining in a cylinder, is changed, comprising:

blow back gas amount-calculating means for calculating a blow back gas amount, which is an amount of gas which once flowed out of the cylinder into at least one of an intake system and an exhaust system, and thereafter, flows into the cylinder again;

overlap center position-calculating means for calculating one of a crank angle position in the center between a starting point and an ending point of the valve overlap period and a crank angle position near the crank angle position in the center, as an overlap center position, wherein the overlap center position-calculating means calculates the overlap center position based on changes in the timing of at least one of the intake valve and the exhaust valve which causes the overlap center position to shift;

corrected blow back gas amount-calculating means for calculating a corrected blow back gas amount by correcting the calculated blow back gas amount according to the calculated overlap center position; and internal EGR amount-calculating means for calculating the internal EGR amount according to the calculated corrected blow back gas amount, wherein the internal EGR amount is used to change the valve timing of at least one of the intake valve and the exhaust valve.

2. The internal EGR amount calculation device as claimed in claim 1, wherein said corrected blow back gas amount-calculating means calculates the corrected blow back gas amount such that as the overlap center position is more retarded from an exhaust top dead center, the corrected blow back gas amount becomes larger, and as the overlap center position is more advanced from the exhaust top dead center, the corrected blow back gas amount becomes smaller.

3. The internal EGR amount calculation device as claimed in claim 1, wherein said corrected blow back gas amount-calculating means calculates the corrected blow back gas amount such that as the valve overlap period is longer, the corrected blow back gas amount becomes larger.

4. The internal EGR amount calculation device as claimed in claim 2, wherein said corrected blow back gas amount-calculating means calculates the corrected blow back gas amount such that as the valve overlap period is longer, the corrected blow back gas amount becomes larger.

5. The internal EGR amount calculation device as claimed in claim 1, further comprising load parameter acquisition means for acquiring a load parameter indicative of load on the engine, and wherein said corrected blow back gas amount-calculating means calculates the corrected blow back gas amount such that as the load on the engine indicated by the acquired load parameter is higher, the corrected blow back gas amount becomes smaller.

6. The internal EGR amount calculation device as claimed in claim 2, further comprising load parameter acquisition means for acquiring a load parameter indicative of load on the engine, and wherein said corrected blow back gas amount-calculating means calculates the corrected blow back gas amount such that as the load on the engine indicated by the acquired load parameter is higher, the corrected blow back gas amount becomes smaller.

7. The internal EGR amount calculation device as claimed in claim 3, further comprising load parameter acquisition means for acquiring a load parameter indicative of load on the engine, and wherein said corrected blow back gas amount-calculating means calculates the corrected blow back gas amount such that as the load on the engine indicated by the acquired load parameter is higher, the corrected blow back gas amount becomes smaller.

8. The internal EGR amount calculation device as claimed in claim 4, further comprising load parameter acquisition means for acquiring a load parameter indicative of load on the engine, and wherein said corrected blow back gas amount-calculating means calculates the corrected blow back gas amount such that as the load on the engine indicated by the acquired load parameter is higher, the corrected blow back gas amount becomes smaller.

* * * * *